United States Patent
Yochai et al.

(10) Patent No.: US 9,158,637 B2
(45) Date of Patent: Oct. 13, 2015

(54) STORAGE CONTROL GRID AND METHOD OF OPERATING THEREOF

(75) Inventors: Yechiel Yochai, Moshav Aviel (IL); Michael Dorfman, Ramat HaSharon (IL); Dan Alon, Tel Aviv (IL)

(73) Assignee: INFINIDAT LTD., Hertzelia (IL)

( * ) Notice: Subject to any disclaimer, the term of this patent is extended or adjusted under 35 U.S.C. 154(b) by 272 days.

(21) Appl. No.: 13/562,335

(22) Filed: Jul. 31, 2012

(65) Prior Publication Data

US 2014/0040212 A1   Feb. 6, 2014

(51) Int. Cl.
| | |
|---|---|
| G06F 15/16 | (2006.01) |
| G06F 15/167 | (2006.01) |
| G06F 15/177 | (2006.01) |
| G06F 15/173 | (2006.01) |
| G06F 11/20 | (2006.01) |
| G06F 3/06 | (2006.01) |

(52) U.S. Cl.
CPC ............ *G06F 11/2092* (2013.01); *G06F 3/067* (2013.01); *G06F 3/0617* (2013.01); *G06F 3/0635* (2013.01); *G06F 3/0644* (2013.01); *G06F 2201/815* (2013.01)

(58) Field of Classification Search
CPC .............. G06F 11/201; G06F 11/2089; G06F 11/0727; G06F 3/0635; G06F 3/067; H04L 67/1097; H04L 69/40
USPC ......... 709/201, 202, 203, 212, 213, 214, 215, 709/216, 217, 218, 219, 220, 221, 222, 223, 709/224, 225, 226, 238, 239
See application file for complete search history.

(56) References Cited

U.S. PATENT DOCUMENTS

| | | | |
|---|---|---|---|
| 7,360,010 B2* | 4/2008 | Ghaffari et al. | 710/316 |
| 7,363,382 B1* | 4/2008 | Bakke et al. | 709/230 |
| 2002/0083183 A1* | 6/2002 | Pujare et al. | 709/231 |

(Continued)

FOREIGN PATENT DOCUMENTS

WO    2012114338 A1    8/2012

OTHER PUBLICATIONS

Excitingip.com; "VRRP—Virtual Router Redundancy Protocol Provides Network Failover / Redundancy;" Posted Sep. 12, 2011. Download May 13, 2013 from—http://www.excitingip.com/2436/vrrp-virtual-router-redundancy-protocol-provides-network-failoverredundancy/.
Apache Cloudstack; "Apache CloudStack Wiki: Info on Developing and Contributing to Apache CloudStack;" Feb. 14, 2011. Download May 13, 2013 from—http://docs.cloud.com/CloudStack_Documentation/Design_Documents/Redundant_Virtual_Router.

(Continued)

*Primary Examiner* — Edward Kim
(74) *Attorney, Agent, or Firm* — Reches Patents

(57) ABSTRACT

There is provided a storage control grid capable of controlling at least one service provided in the storage system and a method of operating thereof. The storage control grid comprises at least one service dispatcher operatively coupled to at least one service requestor and to a plurality of service providers. The method comprises requesting by service requester a service, thus giving rise to at least one service request; enabling, using said at least one service dispatcher, delivery of the service request to at least one service provider among said plurality of service providers, said service provider configured to provide said at least one service, wherein the delivery is enabled in accordance with data comprised in a service data structure handled by said at least one service dispatcher and indicative, at least, of association between said at least one service and service providers among said plurality of service providers.

18 Claims, 8 Drawing Sheets

(56) References Cited

U.S. PATENT DOCUMENTS

| | | | |
|---|---|---|---|
| 2004/0205288 A1* | 10/2004 | Ghaffari et al. | 711/100 |
| 2009/0276771 A1* | 11/2009 | Nickolov et al. | 717/177 |
| 2010/0153693 A1* | 6/2010 | Stall et al. | 712/229 |
| 2013/0007410 A1* | 1/2013 | Kopylovitz et al. | 711/209 |
| 2014/0040343 A1* | 2/2014 | Nickolov et al. | 709/201 |

OTHER PUBLICATIONS

Cisco; "High-Availability Storage Networks with Cisco MDS 9500 Series Multilayer Directors;" 2011. Download May 13, 2013 from— http://www.cisco.com/en/US/prod/collateral/modules/ps5991/prod_white_paper0900aecd8044c832_ps5990_Products_White_Paper.html.

* cited by examiner

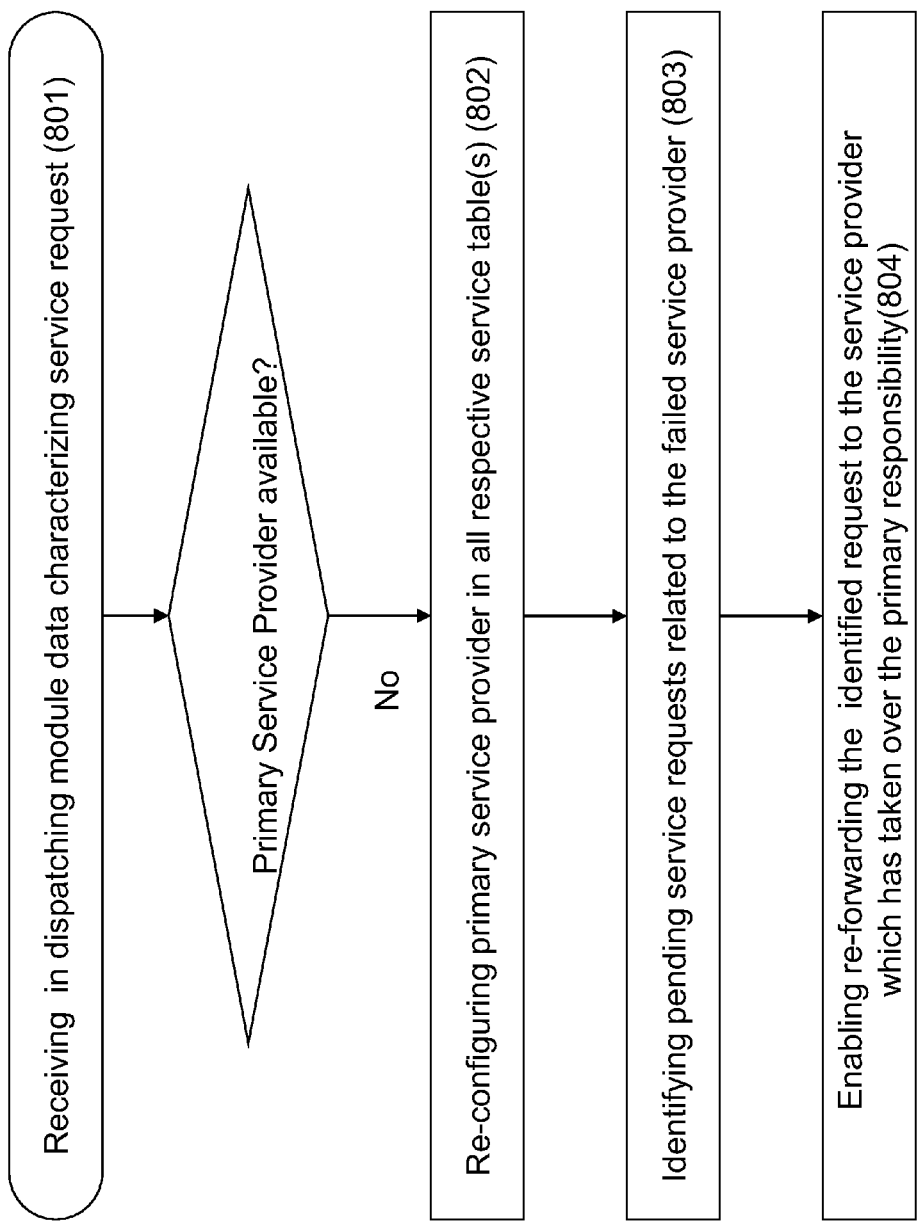

STORAGE CONTROL GRID AND METHOD OF OPERATING THEREOF

TECHNICAL FIELD

The presently disclosed subject matter relates, in general, to data storage systems and respective methods for data storage, and, more particularly, to grid storage systems and methods of operating thereof.

BACKGROUND

Modern enterprises are investing significant resources to preserve and provide access to data. Data protection is a growing concern for businesses of all sizes. Users are looking for a solution that will help to verify that critical data elements are protected, and storage configuration can enable data integrity and provide a reliable and safe switch to redundant computing resources in case of an unexpected disaster or service disruption.

The need for large data storage motivates the building of grid storage systems. Grid architecture can include modular storage arrays having a common virtualization layer enabling organization of the storage resources as a single logical pool available to users and a common management across all nodes. Grid storage systems often use a server cluster for implementing the common management of the storage resources. A server cluster consists of multiple interconnected servers that can be viewed as a single server. The cluster is deployed to improve performance, reliability and availability over that of a single server. Optionally, grid architecture can be implemented in a cloud model of networked online storage where data is stored on multiple virtualized storage systems rather than being hosted on dedicated systems. Physical storage resources can span across multiple systems, while cloud storage enables presenting to a user a logical space for data storage and itself handles the process of mapping the logical space to the actual physical location.

Grid storage architecture needs to support manageability, scalability, load balancing, availability and fault tolerance of provided storage services.

SUMMARY

In accordance with certain aspects of the currently presented subject matter, there is provided a storage control grid capable of controlling at least one service provided in a storage system. The storage control grid comprises at least one service requestor, a plurality of service providers and at least one service dispatcher operatively connected to the at least one service requestor. The service requester is configured to request the at least one service, thus giving rise to at least one service request; at least one service provider among the plurality of service providers is configured to provide the at least one service; the at least one service dispatcher is configured to handle a service data structure indicative, at least, of association between the at least one service and the at least one service provider among the plurality of service providers; the at least one service dispatcher is further configured to enable delivery of the at least one service request to the at least one service provider among the plurality of service providers in accordance with data comprised in the service data structure. Optionally, the at least one service dispatcher and the at least one service requestor can be parts of a control module comprised in the storage control grid.

In accordance with further aspects of the currently presented subject matter, one and only one service provider among the plurality of service providers is configured to have a primary responsibility for providing the at least one service; at least one other service provider among the plurality of service providers is configured to have a secondary responsibility for providing the at least one service; and the service dispatcher is configured to enable delivery of the at least one service request to the service provider having the primary responsibility, and is further configured to enable delivery of the at least one service request to the service provider having the secondary responsibility in case of a failure of the service provider having the primary responsibility. Optionally, the at least one service can be characterized by a given address range, and the responsibilities of the service providers can be configured with regard to the given address range.

The storage control grid can further comprise a first plurality of operatively interconnected control modules each, respectively, comprising one or more service requestors and the at least one service dispatcher configured to handle service requests from the service requestors, wherein service dispatchers in different control modules in the first plurality of control modules comprise equivalent service data structures.

In accordance with further aspects of the currently presented subject matter, one and only one control module is configured to have a primary responsibility for providing the at least one service; at least one other control module among the plurality of control modules is configured to have a secondary responsibility for providing the at least one service with regard to the given address range; and all service dispatchers comprised in the plurality of control modules are configured to enable delivery of the at least one service request to the control module having the primary responsibility, and are further configured to enable delivery of the at least one service request to the control module having the secondary responsibility in case of a failure of the control module having the primary responsibility. Optionally, the at least one service can be characterized by a given address range, and the responsibilities of the service providers can be configured with regard to the given address range.

In accordance with further aspects of the currently presented subject matter, the storage control grid can further comprise a second plurality of operatively interconnected control modules each, respectively, comprising one or more service requestors and a service dispatcher configured to handle service requests therefrom, wherein the service dispatchers in different control modules in the second plurality of control modules comprise equivalent service data structures. The storage control grid can further comprise a centralized service dispatcher configured to handle data indicative of service data structures to be involved in enabling delivery of a service request related to control modules from different pluralities of control modules.

In accordance with further aspects of the currently presented subject matter, the service dispatcher can be configured to update its service data structure responsive to at least one of the following events: subscribing a new service provider in the storage system; adding new physical storage resources to the storage system; deleting physical storage resources from the storage system; adding new logical storage resources to the storage system; configuration changes in the logical storage resources of the storage system; failure of a service provider configured to have a primary responsibility on the at least one service; and hot upgrade of a control module comprised in the storage control grid.

In accordance with further aspects of the currently presented subject matter, the storage control grid can comprise two or more service dispatchers handling equivalent service data structures, wherein all service dispatchers can be configured to update respectively handled service data structures responsive to a change in a service data structure handled by at least one of the service dispatchers, thereby enabling equivalence of the updated service data structures.

In accordance with other aspects of the currently presented subject matter, there is provided a service dispatcher to be used in conjunction with a storage control grid capable of controlling at least one service provided in the storage system, the storage control grid comprising at least one service requestor, and one or more service providers. The service dispatcher is operatively coupled to the at least one service requestor and configured to handle a service data structure indicative, at least, of association between the at least one service and the service providers. The service dispatcher is further configured to enable delivery of a service request sent by the at least one service requestor with respect to the at least one service, the delivery enabled to a service provider configured to provide the at least one service and in accordance with data comprised in the service data structure.

In accordance with further aspects of the currently presented subject matter, the service data structure defines one and only one service provider associated with the at least one service as having primary responsibility and at least one other service provider associated with the at least one service as having secondary responsibility; and the service dispatcher is configured to enable delivery of the service request to the service provider having the primary responsibility, and is further configured to enable delivery of the service request to the service provider having the secondary responsibility in case of a failure of the service provider having the primary responsibility. Optionally, the at least one service can be characterized by a given address range, and the responsibilities of the service providers can be configured with regard to the given address range.

The service dispatcher can constitute a part of a control module, the control module further comprising one or more storage requestors, wherein the service dispatcher can be further configured to handle pending service requests issued by the one or more service requestors comprised in the control module.

In accordance with other aspects of the currently presented subject matter, there is provided a method of operating a storage control grid capable of controlling at least one service provided in the storage system, the storage control grid comprising at least one service dispatcher operatively coupled to at least one service requestor and to a plurality of service providers. The method comprises requesting by the at least one service requester at least one service, thus giving rise to at least one service request; enabling, using the at least one service dispatcher, delivery of the at least one service request to at least one service provider among the plurality of service providers, the at least one service provider configured to provide the at least one service, wherein the delivery is enabled in accordance with data comprised in a service data structure handled by the at least one service dispatcher and indicative, at least, of association between the at least one service and service providers among the plurality of service providers.

Requesting the at least one service can comprise sending by the at least one service requester a relevant message to the at least one service dispatcher; identifying, by the at least one service dispatcher with the help of the service data structure, at least one service provider configured to provide the at least one service; and redirecting the message from the at least one service dispatcher to the at least one identified service provider.

Additionally or alternatively, requesting the at least one service can comprise sending by the at least one service requester a relevant message to the at least one service dispatcher; identifying, by the at least one service dispatcher with the help of the service data structure, at least one service provider configured to provide the at least one service with respect to the given address range; generating by the at least one service dispatcher another message indicative of the at least one service requester and/or respective service request; and sending the generated message to the at least one identified service provider.

Additionally or alternatively, requesting the at least one service can comprise sending by the at least one service requester a relevant message to the at least one service dispatcher; identifying, by the at least one service dispatcher with the help of the service data structure, at least one service provider configured to provide the at least one service with respect to the given address range; generating by the at least one service dispatcher another message indicative of the at least one service provider; sending the generated message to the at least one service requester; and sending by the at least one service requester the service request to the at least one service provider in accordance with data comprised in the message generated by the at least one service dispatcher.

In accordance with further aspects of the currently presented subject matter, one and only one service provider can be configured to have a primary responsibility for providing the at least one service with regard to a given address range and at least one other service provider among the plurality of service providers can be configured to have a secondary responsibility for providing the at least one service with regard to the given address range. The method further comprises reconfiguring the service data structure upon receiving an indication of failure of the service provider configured to have the primary responsibility, wherein the service provider configured to have secondary responsibility is reconfigured to take over primary responsibility with regard to the at least one service and the given address range. In case the storage control grid comprises two or more service dispatchers handling service data structures that include information related to the failed service provider, the method can further comprise respective reconfiguring all such service data structures.

In accordance with further aspects of the currently presented subject matter, if the service dispatcher constitutes a part of a control module, the control module further comprises one or more storage requestors, and the method further comprises: upon receiving an indication of failure of the service provider configured to have the primary responsibility, identifying by the at least one service dispatcher pending service requests addressed to the service provider; and enabling forwarding the requests to the service provider which has taken over the primary responsibility.

Among advantages of certain embodiments of the presently disclosed subject matter is capability of effectively maintaining consistency of service management in the storage system in cases of a service provider failure, subscribing a new service provider in the storage system; adding new physical storage resources to the storage system; deleting physical storage resources from the storage system; adding new logical storage resources to the storage system; configuration changes in the logical storage resources of the storage system; workload distribution changes and other changes with potential impact on providing services in the storage system.

BRIEF DESCRIPTION OF THE DRAWINGS

In order to understand the disclosed subject matter and to see how it can be carried out in practice, embodiments will now be described, by way of non-limiting example only, with reference to the accompanying drawings, in which:

FIG. 8 illustrates a generalized flow diagram of handling service requests in accordance with certain embodiments of the presently disclosed subject matter.

DETAILED DESCRIPTION OF EMBODIMENTS

In the following detailed description, numerous specific details are set forth in order to provide a thorough understanding of the disclosed subject matter. However, it will be understood by those skilled in the art that the presently disclosed subject matter can be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "defining", "generating", "requesting", "sending", "identifying", "selecting", "directing", "managing" or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities, including, by way of non-limiting example, storage system and parts thereof disclosed in the present applications.

The operations in accordance with the teachings herein can be performed by a computer specially constructed for the desired purposes or by a general-purpose computer specially configured for the desired purpose by a computer program stored in a computer readable storage medium.

Embodiments are not described with reference to any particular programming language. It will be appreciated that a variety of programming languages can be used to implement the teachings as described herein.

The references cited in the background teach many principles of operating a storage system that are applicable to the presently disclosed subject matter. Therefore the full contents of these publications are incorporated by reference herein where appropriate for appropriate teachings of additional or alternative details, features and/or technical background.

Figure 1:
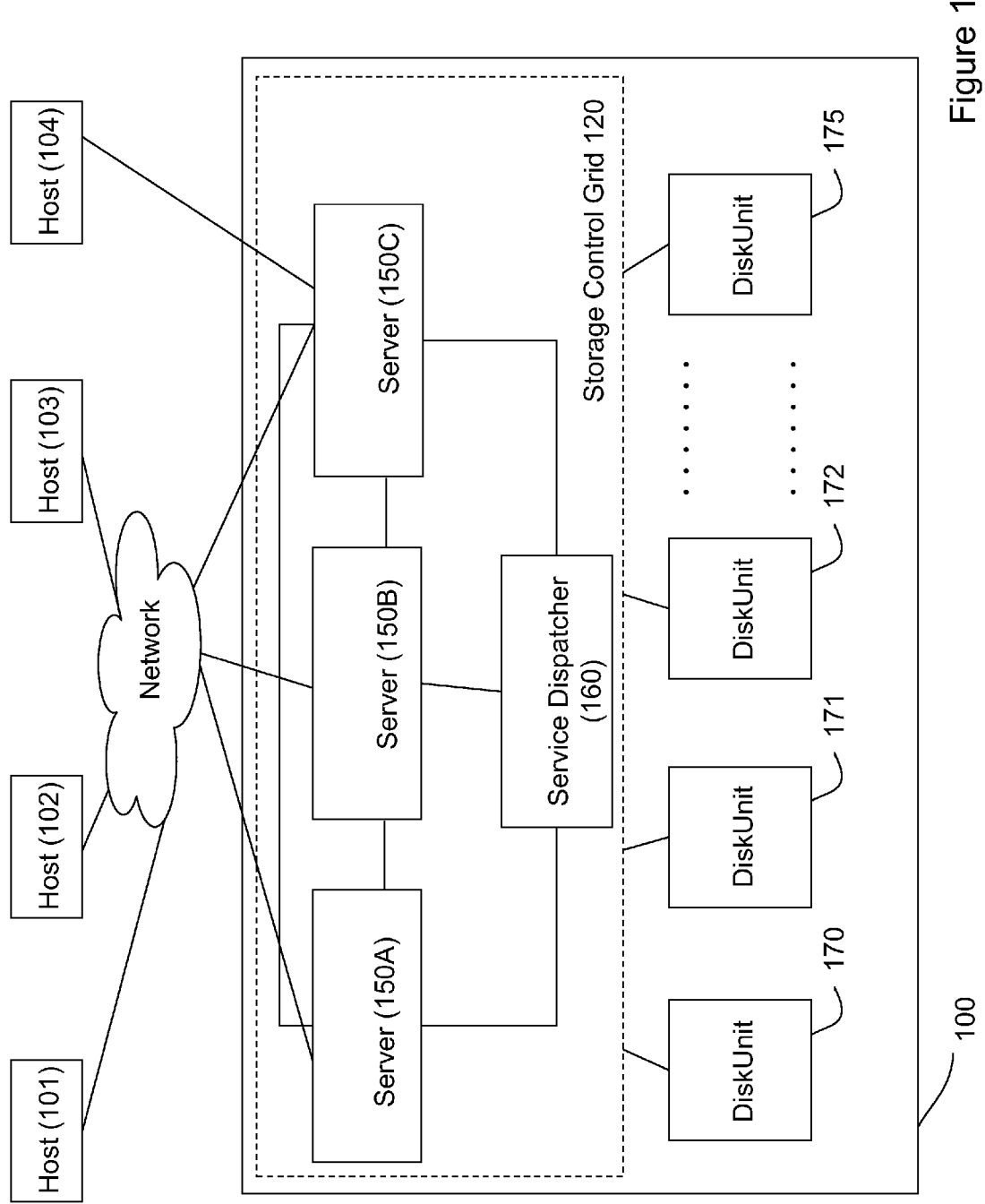
FIGS. 1 and 2 illustrate functional diagrams of an exemplary embodiment of a grid storage system in accordance with presently disclosed subject matter.

Bearing this in mind, attention is drawn to FIG. 1 illustrating a functional diagram of an exemplary embodiment of a grid storage system in accordance with the presently disclosed subject matter.

The plurality of host computers (workstations, application servers, etc.) illustrated as 101-104 share common storage means provided by a storage system 100. The storage system comprises a plurality of data storage devices (illustrated as 170-175) constituting a physical storage space of the storage system optionally distributed over one or more storage nodes, and a storage control grid 120 operable to control interface operations (including I/O operations) between host computers and the plurality of storage devices. The storage control grid is further operable to handle a virtual representation of the physical storage space and to facilitate necessary mapping between the physical storage space and its virtual representation. The virtualization functions can be provided in hardware, software, firmware or any suitable combination thereof. The storage control grid can be further operable to control background processes and/or enable management processes implemented in the storage system. The storage control grid and the storage devices can communicate with the host computers and within the storage system in accordance with any appropriate storage protocol.

Stored data can be logically represented to a client (e.g. a user, an application, etc.) in terms of logical objects. Depending on storage protocol, the logical objects can be logical volumes, data files, image files, etc. For purpose of illustration only, the following description is provided with respect to logical objects represented by logical volumes. Those skilled in the art will readily appreciate that the teachings of the presently disclosed subject matter are applicable in a similar manner to other logical objects.

A logical volume or logical unit (LU) is a virtual entity logically presented to a client as a single virtual storage device. The logical volume represents a plurality of data blocks characterized by successive Logical Block Addresses (LBA) ranging from 0 to a number LUK. Different LUs can comprise different numbers of data blocks, while the data blocks are typically of equal size (e.g. 512 bytes). Blocks with successive LBAs can be grouped into portions that act as basic units for data handling and organization within the system. Thus, for instance, whenever space has to be allocated on a disk or on a memory component in order to store data, this allocation can be done in terms of data portions also referred to hereinafter as "allocation units". Data portions are typically of equal size throughout the system (by way of non-limiting example, the size of a data portion can be 64 Kbytes).

When receiving a write request from a host, the storage control grid defines a physical location(s) for writing the respective data (e.g. a location designated in accordance with an allocation scheme, preconfigured rules and policies and/or location available for a log-structured storage, etc.) and further processes the request accordingly. When receiving a read request from the host, the storage control grid obtains the physical location(s) of the desired data and further processes the request accordingly.

The storage control grid 120 comprises a plurality of servers (illustrated as 150A, 150B, 150C) interconnected via any suitable protocol (e.g. TCP/IP, Infiniband, etc.).

In accordance with certain embodiments of the presently disclosed subject matter, the storage control grid 120 further comprises a service dispatcher 160 operatively interconnected with the servers as will be further detailed with reference to FIGS. 5-8. The service dispatcher 160 can be implemented as a centralized module operatively connected to the each server or can be distributed over a part or all servers in the storage control grid (including duplication of certain functions at several servers). Optionally, only part of the functions of the service dispatcher can be implemented as service dispatcher modules within the servers, these modules operatively interconnected with a central service dispatcher module implementing the other part of functions.

Each server in the storage control grid 120 is associated with a predefined range of logical and/or physical addresses, such range of addresses is referred to hereinafter as the address range under responsibility of the respective server. Optionally, such address range can correspond to the entire address space of the storage system.

For purpose of illustration only, the following description in most cases is provided with respect to I/O requests to be handled by a server. Those skilled in the art will readily appreciate that the teachings of the presently disclosed subject matter are applicable in a similar manner to configuration or other requests initiated by a client unless specifically stated otherwise.

An I/O request coming from a host is initially handled by a receiving server operable to define which data needs to be read or written and from/to which address location. When a given server receives an I/O request, it is operable to issue an I/O service request, as will be further detailed with reference to FIGS. 5-8, to a server responsible for the respective address range for appropriate handling. The server responsible for the respective address range may be the receiving server or another server.

In order to enable failure tolerance, the address range can be associated with several servers having different responsibility for the address space. As illustrated by way of non-limiting example with reference to FIG. 2, each LBA (e.g. LBA 201) can be associated with a server (e.g. 105A) with a primary responsibility and a server (e.g. 105B) with a secondary responsibility with regard to said LBA. It should be noted that responsibility of a certain server may be changed during the operation of the storage system, and the terms "primary server" and "secondary servers" in the following description are related to pre-assigned responsibility of the servers. For example, the secondary server can operate with the primary responsibility during takeover and recovery/retake processes.

A primary server handles all I/O requests directed to an address range under its primary responsibility. If a certain I/O request is received by a server which is not the primary server with respect to at least part of the desired address range, the respective part of the request is forwarded to a corresponding primary server. A secondary server overtakes primary responsibility for the address range under its secondary responsibility if/when the respective primary server fails.

In order to further increase availability of the storage system and to enable tolerance to a double hardware failure, each LBA (e.g. 201) can be associated with three servers: primary server (e.g. 105A), main secondary server (e.g. 105B) and auxiliary secondary server (e.g. 105C). An auxiliary secondary server overtakes primary responsibility for the respective address range if/when the respective primary server and main secondary server fail. Different types of responsibility of a given server for I/O requests addressed to certain address ranges are referred to hereinafter as different I/O services provided by the given server with respect to these address ranges.

Likewise detailed above with reference to the client-initiated requests, the teachings of the presently disclosed subject matter are applicable to other services controlled by the storage control grid (e.g. background processes, management processes, etc.) as will be further detailed with reference to FIGS. 5-8.

In accordance with certain embodiments of the currently presented subject matter, each LBA is associated with one and only one server currently controlling a given service with primary responsibility. Each LBA is further associated with one or more servers having secondary responsibility for controlling a given service with respect to this address range. A data structure comprising data indicative of associations between the servers, services and LBAs (and/or ranges thereof) is maintained by the service dispatcher 160 as will be further detailed with reference to FIGS. 5-8.

Figure 3:
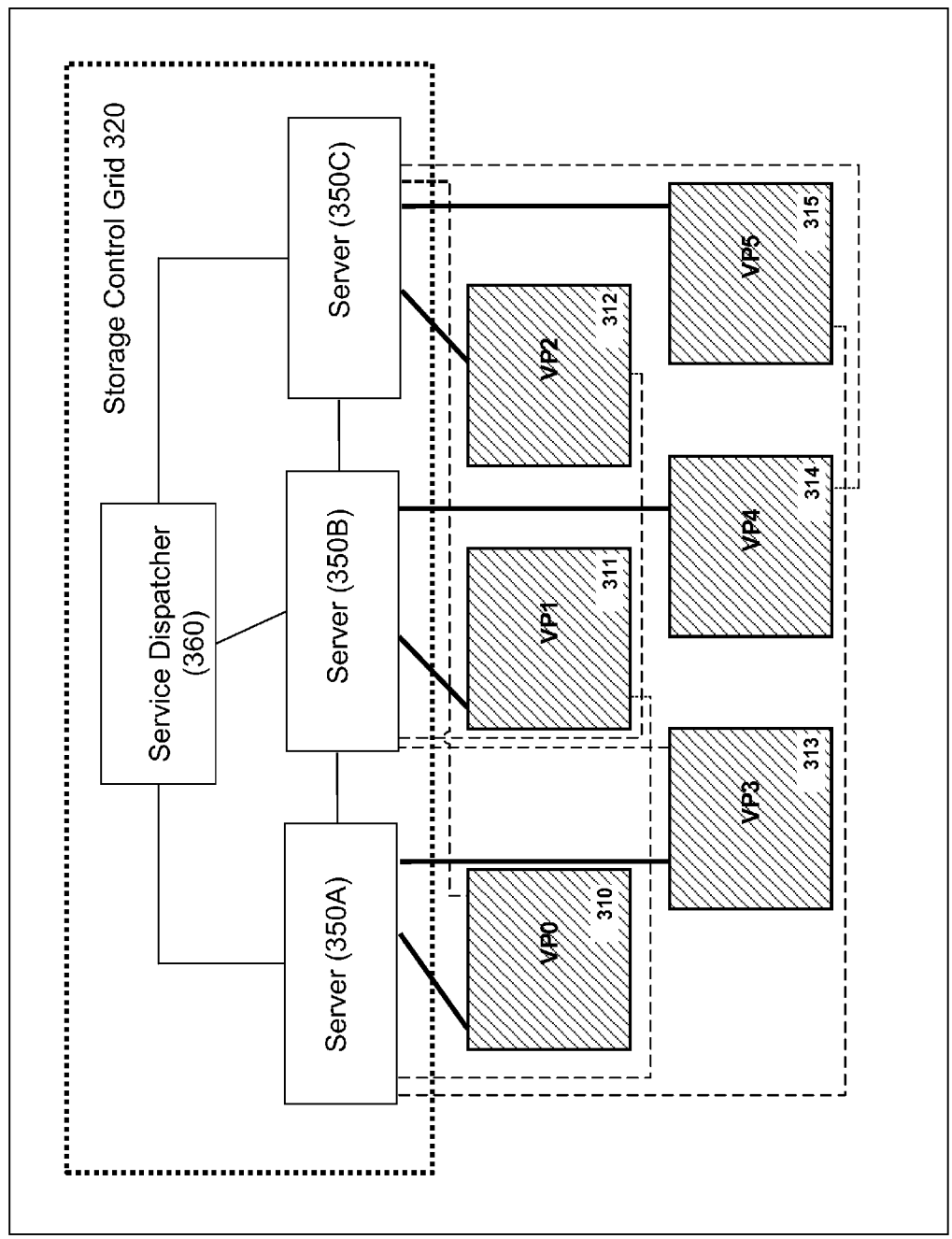
FIG. 3 illustrates a functional diagram of another exemplary embodiment of a grid storage system in accordance with presently disclosed subject matter.

Referring to FIG. 3, there is illustrated a functional diagram of another exemplary embodiment of a grid storage system in accordance with the presently disclosed subject matter.

As known in the art, storage virtualization enables referring to different physical storage devices and/or parts thereof as logical storage entities provided for access by the hosts. The entire storage space can be divided into a plurality of Virtual Partitions (VPs), each comprising one or more logical volumes. FIG. 3 illustrates a functional diagram of a grid storage system 300 divided into a plurality of VPs (310-315). Similar to the storage system 100 illustrated with reference to FIGS. 1-2, the storage system 300 comprises the storage control grid 320, the control grid comprising two or more servers (illustrated as 350A, 350B and 350C) interconnected or fully or partly integrated with a service dispatcher 360.

Likewise detailed in the storage system 100, the service dispatcher can be implemented as a centralized module operatively connected to each server or can be distributed over a part or all servers in the storage control grid (including duplication of certain functions at several servers). Optionally, only part of the functions of the service dispatcher 360 can be implemented as service dispatcher modules within the servers, these modules operatively interconnected with a central service dispatcher module implementing the other part of the dispatcher's functions.

Responsibility for the address range covered by each VP is distributed among the servers. Each server is assigned with primary responsibility (i.e. as a primary server) over at least two VPs, and is assigned with secondary responsibility (i.e. as a secondary sever) over at least two additional VPs. Each VP is controlled by at least two servers—a primary server and a secondary server. As illustrated by way of non-limiting example in FIG. 3, the servers are configured in accordance with Table 1, and the virtual partitions are respectively configured in accordance with Table 2.

TABLE 1

| Server | Primary Responsibility (continuous line in FIG. 3) | Secondary Responsibility (dashed line in FIG. 3) |
| --- | --- | --- |
| 350A | VP0, VP3 | VP1, VP5 |
| 350B | VP1, VP4 | VP2, VP3 |
| 350C | VP2, VP5 | VP0, VP4 |

TABLE 2

| VP  | Primary Responsibility | Secondary Responsibility |
|-----|------------------------|--------------------------|
| VP0 | 150A                   | 150C                     |
| VP1 | 150B                   | 150A                     |
| VP2 | 150C                   | 150B                     |
| VP3 | 150A                   | 150B                     |
| VP4 | 150B                   | 150C                     |
| VP5 | 150C                   | 150A                     |

The terms "primary responsibility" or "primary control" with regard to a VP should expansively mean that a server handles all such requests directed to LUs defined in the VP. The terms "secondary responsibility" or "secondary control" with regard to a VP should expansively mean that a server operable to take primary responsibility for the address range under its secondary responsibility if/when the respective primary server fails. Likewise, primary and secondary responsibilities can be defined for other services related to a VP.

Likewise detailed with reference to storage system 100, availability of the storage system 300 can be enhanced by associating each VP with three servers: primary server, main secondary server and auxiliary secondary server.

In accordance with certain embodiments of the currently presented subject matter, each VP is associated with one and only one server currently controlling a given service with primary responsibility. Each VP is further associated with one or more servers having secondary responsibility for controlling the given service with respect to this VP. Data structures comprising data indicative of associations between the servers, services and VPs are maintained by the service dispatcher 160 as will be further detailed with reference to FIGS. 5-8.

Figure 2:
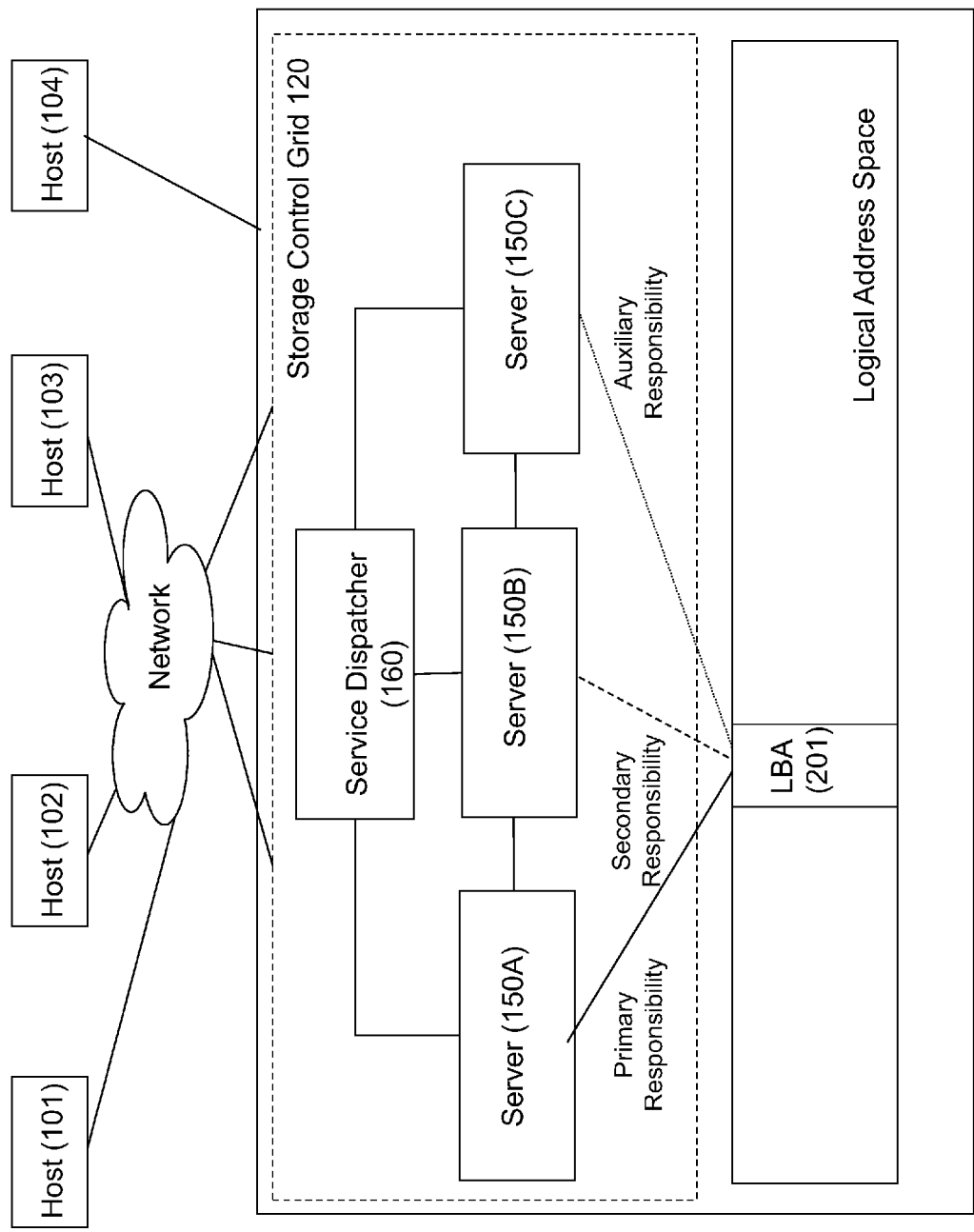

By way of non-limiting example, the storage systems illustrated with reference to FIGS. 1-3 can operate in a manner disclosed in U.S. patent application US2010/0153639, assigned to the assignee of the present application and incorporated herein by reference in its entirety.

Figure 4:
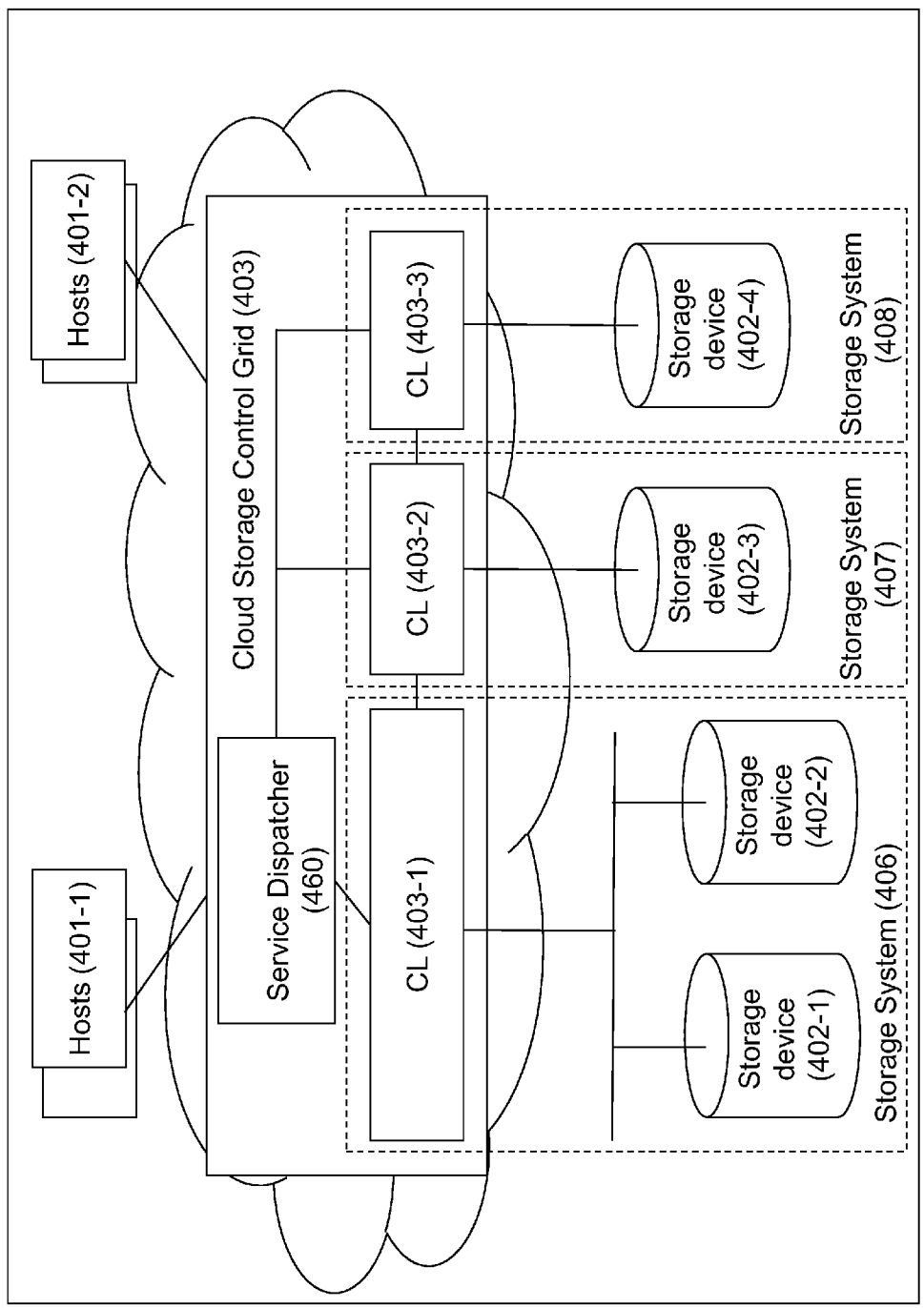
FIG. 4 illustrates an exemplary cloud storage arrangement in accordance with certain embodiments of the currently presented subject matter.

Referring to FIG. 4, there is illustrated an exemplary cloud storage arrangement 400 in accordance with certain embodiments of the currently presented subject matter.

The plurality of host computers (workstations, application servers, etc.) illustrated as host groups 401-1 and 401-2 are enabled to have a network access to data physically stored in one or more storage systems illustrated as 406-408. As illustrated by way of non-limiting example, storage system 406 comprises a control layer 403-1 and storage devices 402-1 and 402-2; a storage system 407 comprises a control layer 403-2 and storage device 402-3; and a storage system 408 comprises a control layer 403-3 and storage device 402-4. The storage systems and the control layers thereof can be configured as detailed with reference to FIGS. 1-3.

The cloud storage arrangement 400 further includes a cloud storage control grid 403 comprising individual control layers of the storage systems. The cloud storage control grid is operable to control interface operations (including I/O operations) between the host computers and the parts of physical storage space available to respective hosts. The cloud storage control grid 403 is further operable to handle a virtual representation of physical storage space. The cloud control grid can control interface operations for given hosts regardless of how the physical storage space available to these hosts is distributed over different storage systems. For example, Small Computer System Interface (SCSI) Input/Output (I/O) referral techniques can be utilized to facilitate communication between an initiator system and the storage resources in the cloud storage arrangement. A data requester can transmit a data request command to a first storage system of the cloud storage arrangement. If a portion of the data requested is not stored by the first storage system, but is stored by a second storage system of the cloud storage arrangement, scale-out techniques such as data forwarding can be utilized for accessing data stored by the second storage system.

Each control layer has primary responsibility for services related to given storage device(s) under direct control of the control layer of the respective storage system. For example, an I/O request coming from a host is initially handled by a receiving control layer operable to define which data needs to be read or written and from/to which address location. When a given control layer receives an I/O request, it is operable to issue an I/O service request, as will be further detailed with reference to FIGS. 5-8, to a control layer responsible for the respective address space for appropriate handling.

In order to enable failure tolerance, the physical and/or logical address range can be associated with several control layers having different responsibility for the address space. For example, storage devices in the storage system 406 can be associated with the control layer 403-1 with a primary responsibility and the control layer 403-2 with a secondary responsibility with regard to logical storage space corresponding to the devices. It should be noted that responsibility of a certain control layer may be changed during the operation of the storage system, and the terms "primary" and "secondary" in the description are related to the pre-assigned responsibility.

A primary control layer handles all services related to an address range under its primary responsibility. For example, if a certain I/O request is received by a control layer which is not in the primary responsibility with respect to at least part of the desired address range, the respective part of the request is forwarded to a corresponding primary control layer. A secondary control layer overtakes primary responsibility for the address range under its secondary responsibility if/when the respective primary control layer fails.

In order to further increase availability of the storage system and to enable tolerance to a double hardware failure, each physical storage device can be associated with three control layers: primary control layer (e.g. 402-1), main secondary server (e.g. 402-2) and auxiliary secondary server (e.g. 402-3). An auxiliary secondary control layer overtakes primary responsibility for the respective address range if/when the respective primary control layer and main secondary control layer fail.

In accordance with certain embodiments of the currently presented subject matter, each storage resource is associated with one and only one control layer currently controlling a given service with primary responsibility. Each storage resource is further associated with one or more servers having secondary responsibility for controlling a given service with respect to this resource. A data structure comprising data indicative of associations between the servers, services and storage resources is maintained by the service dispatcher 460 as will be further detailed with reference to FIGS. 5-8.

The service dispatcher 460 can be implemented as a centralized module operatively connected to each control layer or can be distributed over a part or all control layers in the cloud storage control grid 403 (including duplication of certain functions at several servers). Optionally, only part of the functions of the service dispatcher 460 can be implemented as service dispatcher modules within the control layers, these modules operatively interconnected with a central service dispatcher module implementing the other part of the functions.

By way of non-limiting example, the cloud storage arrangement illustrated with reference to FIG. 4 can operate in a manner disclosed in International Patent Application PCT/IL2012/050056 filed Feb. 22, 2012, assigned to the assignee of the present application and incorporated herein by reference in its entirety.

Figure 5:
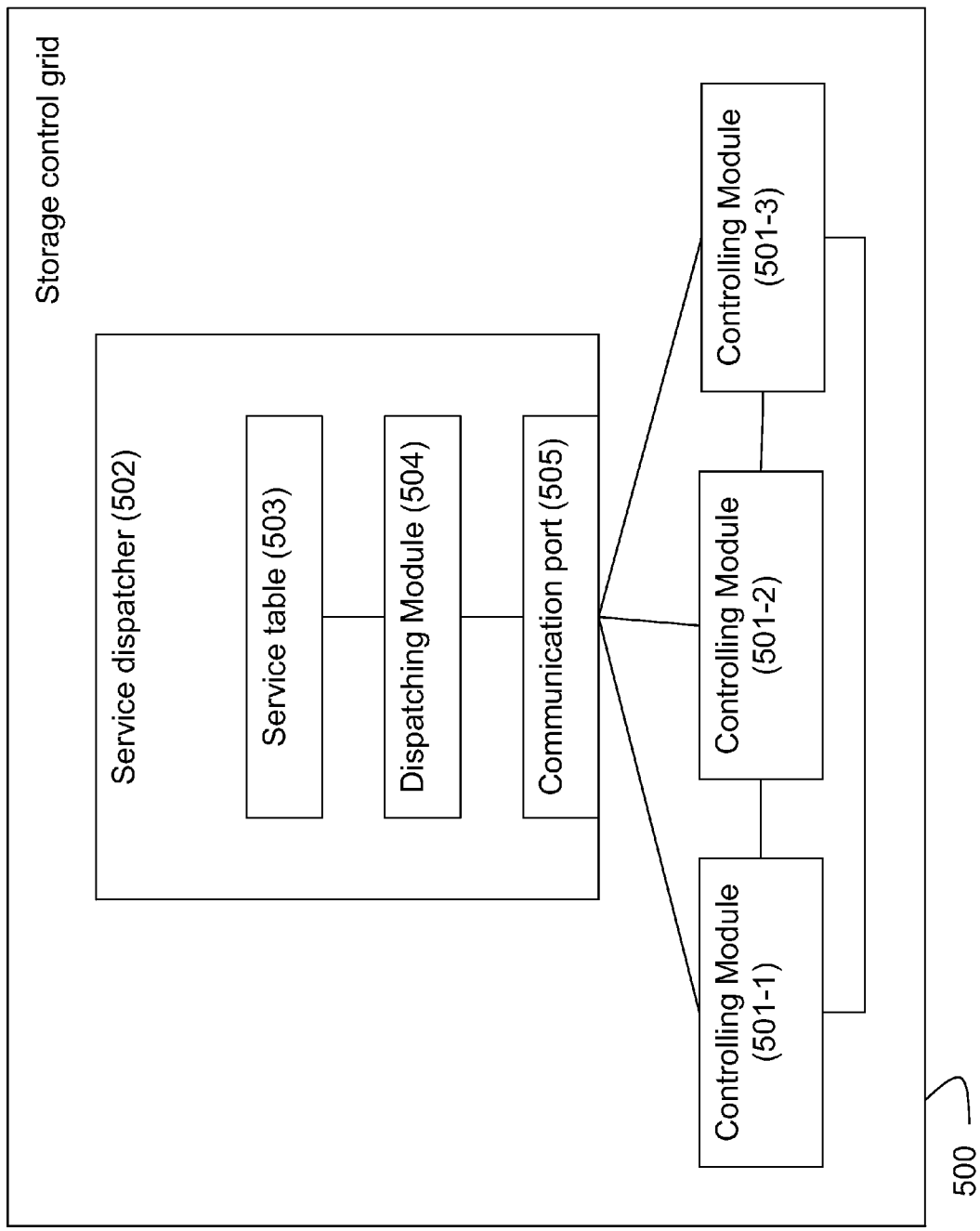
FIG. 5 illustrates a generalized functional architecture of a grid storage system with a service dispatcher implemented as a centralized module in accordance with certain embodiments of the currently presented subject matter.

Referring to FIG. 5, there is illustrated a generalized functional architecture of a storage control grid in accordance with certain embodiments of the currently presented subject matter.

The illustrated storage control grid 500 comprises a plurality of interconnected control modules (illustrated as 501-1-501-3). The term "control module" should be expansively construed to cover any kind of a computer operable in the storage system to control services related to the logical and/or physical storage space. By way of non-limiting example, the storage control grid 500 can be the storage control grid 120 or the storage control grid 320 or the cloud storage control grid 403 illustrated above. Likewise, by way of non-limiting example, the control modules can be the servers 150A-150C or the servers 350A-350C or the control layers 403-1-403-3 illustrated above.

The storage control grid further comprises a service dispatcher 502 connected to the control modules via a communication port 505. The service dispatcher 502 further comprises a dispatching module 504 operatively connected to one or more service tables 503.

Preferably, each control module can be connected with at least two other control modules and the communication between the control modules can be provided in a redundant manner.

Figure 6:
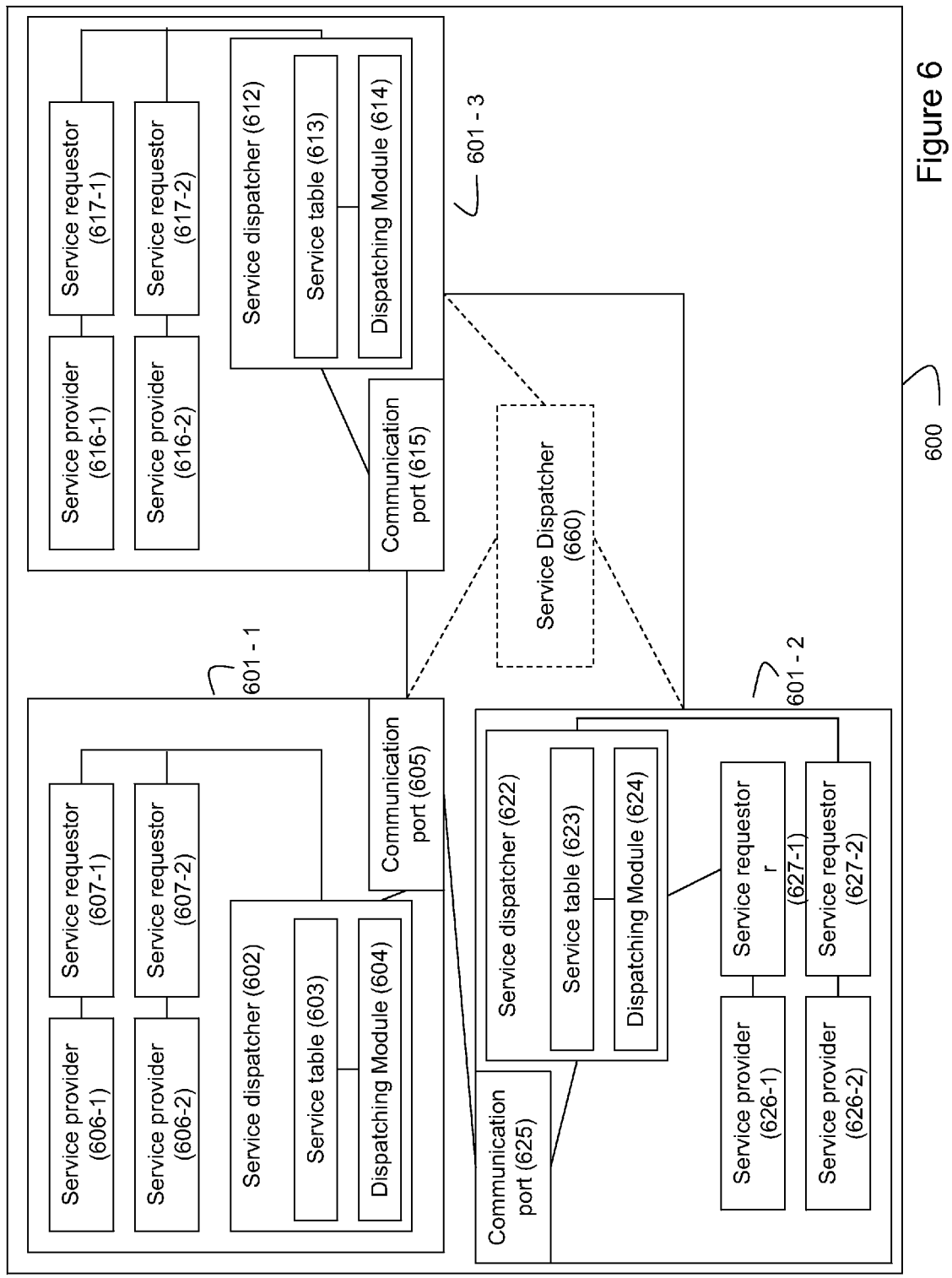
FIG. 6 illustrates a generalized functional architecture of a grid storage system with a service dispatcher distributed between the control modules in accordance with alternative embodiments of the currently presented subject matter.

The service dispatcher can be implemented as a centralized module as illustrated in FIG. 5. Alternatively, functions of the service dispatcher can be distributed (fully or partly) among the control modules as illustrated in FIG. 6 presenting a generalized functional architecture of a storage control grid in accordance with alternative embodiments of the currently presented subject matter. As illustrated in FIG. 6, the functions of the service dispatcher are duplicated in each of the control modules. Functions and operation of the service dispatcher 502 are further detailed with reference to FIGS. 6-8.

Each service controlled by the storage control grid can be characterized by a functional unit operating within the control grid and providing the service, such functional unit is referred to hereinafter as a service provider. Some services can be further characterized by address ranges and/or storage resources associated with respective service providers.

A service is initiated by a functional unit operating within the control grid and requesting the service, such a functional unit being referred to hereinafter as a service requestor. The service request can be initiated by a server within the storage control grid or by a functional module within the server. The service provider can be another server within the storage control grid or a functional module within the same server or another server.

By way of non-limiting example, the service can be access-related (e.g. handling I/O requests, compressing, encrypting, destaging service, etc.), management-related (e.g. volume management, etc.), related to background processes (e.g. de-duplication, defragmentation) or any other service provided in the storage system and controlled by the control grid.

Volume management service is a process that may need to be centralized and thus be controlled by a server configured as a master server for the purpose of volume management. A server that receives a volume management command (e.g. volume creation or deletion) issues a service request directed to the volume managing master server, this request including all the parameters of the received volume command. Thus, the master server serves as a service provider of the volume management service requested by the server that has received the volume management command.

Destaging service provided by a given server can comprise requesting another server to direct the I/O-related operations to a required drive. For example, if physical constrains limit the number of physical connections between the storage control grid and the storage devices, the given server destaging cached data may not have direct access to a storage device required for storing the cached data to be destaged. In such a case, the given server can issue a "drive path" service request directed to another server that has a direct access to the required storage device. Thus, the given server (acting as a service requestor) requests this other server (acting as a service provider for a certain range of physical addresses) to transfer the data destaged by the given server to the storage device.

A background process can be managed in a hierarchical manner. A master server responsible for managing this background process in the storage system can initiate the process and issue service requests (thus acting as a service requestor) to other servers. Upon receiving the service request, each of these servers acts as a service provider and performs the requested background process for controlled resources. For example, in a case of defragmentation process, the master server can issue the defragmentation service requests for servers having primary responsibilities for respective portions of an address space managed by the storage system. Each server, upon receiving the request, provides defragmentation service (acts as a service provider) with respect to the portion of address space under its responsibility. Likewise, in a case of background rebuilding a failed disk, the master server can issue to each server a rebuild service request including a set of identifiers of RAID group contained in the failed disk. Upon receiving the service request, the servers perform the requested rebuilding operations, acting as service providers with respect to RAID groups under respective responsibilities.

The service requestor can request a service responsive to an external trigger (e.g. responsive to an access request, to volume management request or other requests initiated by a client) and/or responsive to an internal requests issued within the storage system (e.g. issued by internal processes, for example, a background process that takes place in one of the servers, etc.).

Service requester and service provider can be implemented as functional units within the same control module, or constitute parts of different control modules (e.g. different servers). Optionally, for certain services, an entire control module comprising a service requestor can be configured in the storage system as respective service requestor, and an entire control module comprising a service provider can be configured in the storage system as respective service provider. By way of non-limiting example, when one of the servers detailed with reference to FIG. 2 serves an access request addressed to the address range under its primary responsibility, both service requester and service provider functions are provided within this server. If a given access request received by the server is addressed to address range under primary responsibility of another server, the first server acts as a service requester and this other server acts as a service provider for the given request.

In accordance with certain embodiments of the presently disclosed subject matter, each service is associated with one and only one service provider currently having primary responsibility with regard to the service. A service provider can be further associated with a given address range. Different service providers can have primary responsibility for the services of the same type with regard to different non-overlapping address ranges.

By way of non-limiting example, address range associated with a service provider can be defined in accordance with logical addresses (e.g. for I/O requests either initiated by the hosts or by the server as a result of another process), in accordance with physical disk drive responsibility (e.g. as part of a destage process), or in accordance with work/load sharing configuration (e.g. per RAID groups, per VUs, etc.).

Optionally, a service provider can be responsible for the entire address range in the storage system or be responsible for a certain service regardless of a specific address range.

A data structure (or a set of interconnected data structures) comprising data indicative of association between the service providers and services in the storage system is referred to hereinafter as a service table. The service table(s) can further comprise data indicative of association with redundant service providers assigned to certain services, network paths preconfigured for the services and other information. The service table can further comprise data indicative of respective storage resources (e.g. address ranges, disk drives) characterizing given services and associated with respective service providers.

A non-limiting example of a data structure in the service table for some services in the storage system 300 is illustrated in Table 3.

structure of Table 3 to enable delivery of a service request issued by the defragmentation master to servers configured to participate in the defragmentation workload sharing. As specified in the illustrated entry "defragmentation background process", the workload shall be distributed in accordance with address range responsibility. The service dispatcher can further use additional (not illustrated) data structure within the service table specifying address range responsibilities of the involved servers. Thus, the defragmentation service request can further include specified address ranges for defragmentation.

The storage control grid 600 illustrated in FIG. 6 comprises a plurality of interconnected control modules (illustrated as 601-1-601-3). Likewise the control grid 500, the storage control grid 600 can be, for example, the storage control grid 120 or the storage control grid 320 or the cloud storage control grid 403 illustrated above; and the control modules can be, for example, the servers 150A-150C or the servers 350A-350C or servers within the control layers 403-1-403-3 illustrated above.

Each control module comprises one or more service providers and one or more service requestors operatively connected to respective service dispatchers. As illustrated, the control module 601-1 comprises service providers (606-1 and 606-2) and service requestors (607-1 and 607-2), service requestors operatively connected to service providers via a service dispatcher 602; the control module 601-2 comprises service providers (616-1 and 616-2) and service requestors

TABLE 3

A non-limiting example of a data structure in the service table

| Service type | Service Provider | Main Redundant Service Provider | Auxiliary Redundant service provider |
|---|---|---|---|
| I/O requests | According to address range primary responsibility | According to address range secondary responsibility | According to address range auxiliary responsibility |
| Disk rebuild | Workload distributed determined in real-time according to involved RAID groups | — | |
| Defragmentation Background process | Workload distributed according to address range of primary responsibility | Workload distributed according to address range of secondary responsibility | |
| Volume Management | Server 350B | Server 350C | — |
| Drive path service | According to physical connection table | | |

The service table(s) can include several data structures. For example, in the data structure illustrated in Table 3, I/O requests are determined to be served according to address range corresponding to servers' responsibilities. Data structure illustrated hereinabove in Table 2 can be a part of the service table and complement data in Table 3 by defining address ranges corresponding to responsibilities of the servers in the service table.

Likewise, for destaging (drive path) service, the service dispatcher can use, in addition to the data structure illustrated in Table 3, a drive path data structure that maps all disk drives in the storage system to one or more directly connected servers and indicates a primary server and a secondary server that have direct access to the certain disk drive.

By way of another non-limiting example, in a case of defragmentation process, the service dispatcher can use data (617-1 and 617-2) operatively connected via a service dispatcher 612; and the control module 601-3 comprises service providers (626-1 and 626-2) and service requestors (627-1 and 627-2) operatively connected via a service dispatcher 622. Optionally, each service dispatcher can be further operatively connected to all service providers comprised in all control modules. Each service dispatcher comprises respective service table(s) and dispatching module. Each control module further comprises a Pending Requests Table (not shown) further detailed with reference to FIGS. 7-8.

Each control module further comprises a respective communication port (illustrated as 605, 615 and 625). The communication port can comprise several functional modules as, for example, SCSI target port operable to receives I/O requests from an external initiator; SCSI initiator port operable to send I/O requests to the drives; Ethernet port for communication with other control modules, etc. The service dispatchers can be, directly or indirectly, connected to the respective communication ports.

Optionally and additionally, the storage control grid 600 can comprise the centralized service dispatcher 660.

In accordance with certain embodiments of the presently disclosed subject matter, all control modules can have equivalent service tables (603, 613, 623). Alternatively, for example in the cloud storage arrangement illustrated with reference to FIG. 4, control modules within the same control layer can have equivalent service tables, whilst being different from service tables of the control modules within another control layer (i.e. related to another storage system).

The service dispatcher 660 can be configured to handle data indicative of service tables to be involved in case of service requests related to control modules handling different service tables. Optionally, the service dispatcher 660 can further handle all service tables corresponding to the service tables in the control modules.

It should be noted that the service dispatchers illustrated with reference to FIGS. 5-6 (560, 602, 612, 622, 660) can interact with an entire control module (and/or a group of control modules) as a single service provider/requestor and/ or can interact separately with service providers/requesters within respective control modules. The service dispatchers are configured to enable delivery of the service request to respective service providers in accordance with data comprised in the service table(s). In case of the distributed architecture, each service dispatcher handles service requests issued in the respective control module.

The service table(s) can be configured at the initial build up of the storage system and can be further updated for each new service and/or storage system changes. The service table(s) can be updated manually by an administrator and/or automatically during a registration of a service provider. In case there are several service dispatchers handling the service tables comprising data related to the registered service providers, a first service dispatcher aware of the new registered service provider enables updating all service tables. By way of non-limiting example, the first service dispatcher can send respective service table update to all other service dispatchers and/or to a master dispatcher (e.g. the centralize dispatcher 660 or one of dispatchers 602, 612, 622 configured as a master) for distribution.

Those skilled in the art will readily appreciate that the disclosed subject matter is not bound by the structure of a service table; data indicative of the association of, at least, the service providers, services and, optionally, respective resources in the storage system can be arranged in any appropriate manner and, optionally, can be distributed between several interconnected data structures, also referred to hereinafter collectively as a "service table" or "service data structure".

When requesting a service, a service requester sends a relevant message to the service dispatcher, and the dispatching module either redirects the message to the service provider in accordance with relevant data comprised in the service table, or generates and sends to the service provider another message corresponding to the message received from the service requester and indicative of service requester and/ or service request. Alternatively or additionally, the service dispatcher can send to the service requester a message indicative of service provider responsible for the service, and service requester can further send the service request directly to the respective service provider. The message exchange can be provided when the service requester and the service provider are parts of the same process or of different processes, as well as when the service requester and the service provider are operating within one and the same control module or in different control modules.

The dispatching modules (504, 604, 614, 624) can be configured to use different messages for different types of service requests. For example, in case of a service request within a common process, the dispatching module can merely pass the respective pointers; in case of service requests between different processes within a control module, the dispatching module can use inter-process communication (e.g. any appropriate technique of inter-thread/application communication); and in case of service requests between different control modules, the dispatching module can use inter-server communication protocols (e.g. Infiniband, Ethernet, etc.)

The service dispatcher can direct a service request to a single service provider or to multiple service providers in multicast or broadcast modes. By way of non-limiting example, in case of rebuilding a failed disk process distributed among several servers each taking care of respective assigned RAID groups, a service request for disk rebuild can be multi-casted for all such servers, wherein each server provides defragmentation service for the respective controlled range. By way of another non-limiting example, in case of a defragmentation process, a service request can be broadcasted within the control layer, wherein each server serves the request with respect to the address range under its control.

The presently disclosed subject matter is not bound by the specific architecture illustrated with reference to FIGS. 1-6; equivalent and/or modified functionality can be consolidated or divided in another manner and can be implemented in any appropriate combination of software, firmware and hardware. Service dispatcher(s), service providers and service requestors can be implemented as suitably programmed computers.

Figure 7:
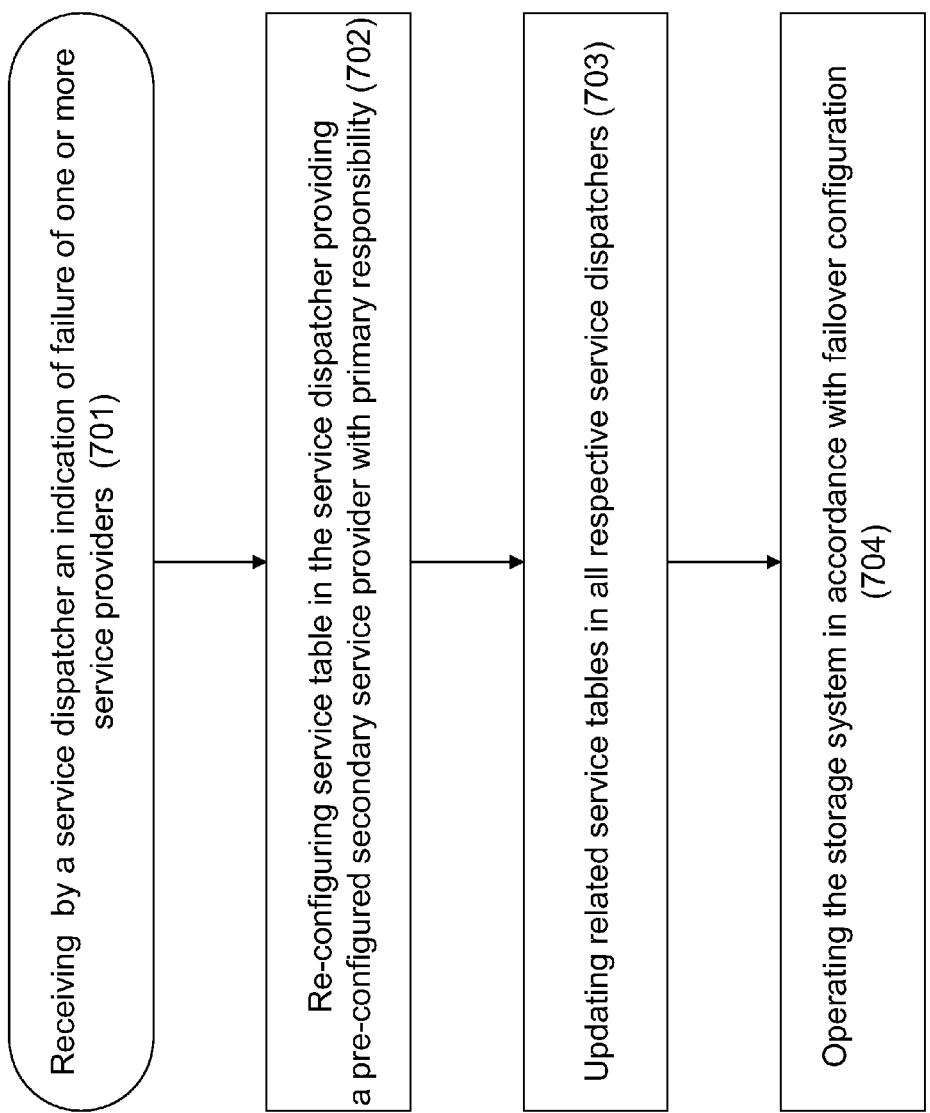
FIG. 7 illustrates a generalized flow diagram of a failover procedure in accordance with certain embodiments of the presently disclosed subject matter.

Referring to FIG. 7, there is illustrated a schematic flow diagram of a failover procedure in accordance with certain embodiments of the presently disclosed subject matter.

Upon receiving (701) by a service dispatcher an indication of failure of a given service provider or an indication of failure of an entire control module or group of control modules, the service dispatcher reconfigures (702) its service table so that a pre-configured secondary service provider(s) get primary responsibility over the respective service(s) and range(s). In case the entire control module fails, the service dispatcher updates its service table so that respective secondary service providers in other control modules get primary responsibility over the services currently assigned to the failed control module. The service dispatcher can receive the indication of failure resulting from an interruption of communication with another control module or respective service providers over a predefined time threshold. Optionally, the interruption in communication can be considered as an indication of the control module failure merely if received via two different paths.

In case there are several service dispatchers handling the service tables comprising data related to the failed service provider (e.g. as in the functional architecture detailed with reference to FIG. 6), a first service dispatcher aware of the failure enables (703) the same reconfiguring as described above in all respective service tables (e.g. by sending the respective service table update to all other service dispatchers or to a master dispatcher for further distribution). Upon updating all relevant service tables, the storage system operates (704) in accordance with failover configuration as further described with reference to FIG. 8.

Referring back to the failover procedures detailed with reference to FIGS. 2-4, and in accordance with the technique detailed with reference to FIG. 7, when a secondary server (e.g. 150B, 350B) or secondary server group (e.g. 403-2) receives indication of failure of the respective primary server (e.g. 150A, 350A) or, respectively, primary server group (e.g. 403-1), it informs its internal and/or centralized service dispatcher(s) on changes of responsibility, thus initiating updating all respective service tables in the control grid. Upon updating the service tables, all service requests to the failed server previously acting as a service provider, will be re-addressed and served by the secondary server/secondary server group (e.g. 150B, 350B, 403-2) assigned to take over the primary responsibility.

Referring to FIG. 8, there is illustrated a schematic flow diagram of handling service requests in accordance with certain embodiments of the presently disclosed subject matter. For purpose of illustration only, the following description is provided with respect to the functional architecture of the storage control grid where each control module comprises an internal service dispatcher with equivalent service tables. Service requester and service provider can operate in different control modules or in the same control module.

Upon receiving (801) a respective message from a service requestor (or otherwise obtaining data characterizing a service request), the service dispatcher $SD_R$ in the requesting control module $CM_R$ uses its service table $ST_R$ in order to recognize the primary service provider with respect to the required service. If the primary service provider is in operational state, the service dispatcher $SD_R$ enables delivering the request to the primary service provider in the providing control module $CM_P$ (optionally the same control module can act as requesting control module $CM_R$ and as providing control module $CM_P$ if respective service requestor and service provider are parts of the same control module). To do so, the service dispatcher $SD_R$ can send a message to the service requestor, said message indicative of the primary service provider to handle the request. Alternatively or additionally, the service dispatcher $SD_R$ can send a message to primary service provider, said message indicative of the service requester and/or service request.

The service dispatcher $SD_R$ is configured to handle pending service requests issued by service requestors in control module $CM_R$. By way of non-limiting example, handling can be provided with the help of a Pending Requests Table (PRT). The service dispatcher $SD_R$ adds in the PRT an entry related to a given issued service request. Once the request is successfully handled by the service provider, the service dispatcher $SD_R$ receives the respective response (e.g. acknowledgement, requested information, etc.) received in push and/or pull mode from the respective service requestor and/or service provider, depending on an implemented protocol). Upon pairing between the service request and corresponding response, the service dispatcher $SD_R$ discharges (e.g. deletes) the corresponding entry in the PRT.

As was detailed with reference to FIG. 7, if service dispatcher $SD_R$ receives an indication of failure of a given service provider, a pre-configured secondary service provider gets primary responsibility over the respective service and the service tables are reconfigured (802) accordingly. The service dispatcher $SD_R$ further checks the PRT for identifying (803) all pending requests (i.e. waiting for completion of the service handling) related to the failed service provider, and enables (804) re-forwarding the request to the service provider which has taken over the primary responsibility. For example, the service dispatcher $SD_R$ can send a message to the service requestor, said message indicative of the takeover primary service provider to handle the request. Alternatively or additionally, the service dispatcher $SD_R$ can send a message to the new primary service provider, said message indicative of the service requester and/or service request.

Optionally, in case the entire control module has failed, the service dispatcher $SD_R$ enables re-forwarding all requests related to services associated with the failed control module to control module(s) which has taken over the primary responsibility with regard to services indicated in the requests. It should be noted that, depending on the service table, different service requests can be forwarded to different service providers (optionally, in different control modules) which have taken over primary responsibility with respect to corresponding requests.

The service dispatcher $SD_R$ can be configured to preserve the order of pending requests when enabling the requests re-forwarding. The service dispatcher $SD_R$ can be further configured to provide priority for serving re-forwarded requests before other pending service requests. Among advantages of certain embodiments of the presently disclosed subject matter is maintaining consistency of service requests in case of a service provider failure.

Likewise detailed above with reference to serving a service request in case of a service provider failure, the teachings of the presently disclosed subject matter are applicable to hot upgrade and other procedures preventing availability of a respective service provider. For example, in case of hot upgrade, the service dispatcher can be available regardless of the unavailability of the server being hot upgraded (by way of non-limiting example, the service dispatcher can be configured as a part of minimal software running during the hot upgrade). Thus, the service dispatcher can be operable to forward a service request to an available service provider.

In case a service requester, service provider and service dispatcher operate in the same failed server, redirecting host requests to a proper service provider can involve additional protection techniques. For example, if a host does not receive during a predefined time an acknowledgement of a service request sent to the failed server, the host can re-send, using multi-path protection, the service request via a redundant path, to another server. The service dispatcher in the server corresponding to the redundant path will enable forwarding the service request to a service provider assigned to take over the respective primary responsibility.

The presently disclosed subject matter is not bound by the specific message exchange flows, formats and protocols illustrated with reference to FIGS. 7-8; equivalent and/or modified functionality can be provided in another appropriate manner.

It should be noted that the above described storage system and method of operating thereof can be used in the framework of SAN, NAS, or any other kind of data storage approach.

It is to be understood that the subject matter is not limited in its application to the details set forth in the description contained herein or illustrated in the drawings. The disclosed technique is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

It will also be understood that the system according to the disclosed subject matter can be a suitably programmed computer. Likewise, the disclosed subject matter contemplates a computer program being readable by a computer for executing the disclosed method. The disclosed subject matter further contemplates a machine-readable memory tangibly embodying a program of instructions executable by the machine for executing the disclosed method.

Those skilled in the art will readily appreciate that various modifications and changes can be applied to the embodiments of the invention as hereinbefore described without departing from its scope, defined in and by the claims associated with the present invention.

The invention claimed is:

1. A storage control grid comprising a plurality of servers, wherein a first server of the plurality of servers is configured as a service dispatcher;
   wherein each service, of services controlled by the storage control grid, is associated with one server of the plurality of servers, acting as a service provider for providing the service;
   wherein each server of the plurality of servers is configured to initiate service requests and to send the service requests to the service dispatcher;
   wherein said service dispatcher is configured to:
   (i) in response to receiving a certain service request indicative of a requested service, identify, among the plurality of servers, a second server acting as a service provider associated with the requested service, and enable delivery of said service request to said service provider;
   (ii) add the certain service request to pending service requests, wherein the pending service requests are requests waiting for completion; and
   (iii) in response to an indication of a failure of the second server, check the pending service requests for service requests directed to the second server, and if identifying the certain service request as a request waiting for completion by the second server, then forward the certain service request to another server of the plurality of servers that is configured as a secondary service provider associated with the requested service.

2. The storage control grid of claim 1, wherein said at least one first server configured as the service dispatcher is a requesting server that initiated the certain service request.

3. The storage control grid of claim 1, wherein multiple servers out of the plurality of servers are configured as service dispatchers; wherein each server of the multiple servers is configured to handle service requests from service requestor modules within the server herein service.

4. The storage control grid of claim 1 wherein the certain service request includes a given address range, and wherein the service provider associated with the certain service request is further associated with said given address range.

5. The storage control grid of claim 1, wherein said service dispatcher is configured to update a service data structure, indicative of
   an association between services and service providers, in response to at least one event selected from a group consisting of:
   subscribing a new service provider in the storage control grid;
   adding new physical storage resources to a physical storage space coupled to the storage control grid;
   deleting physical storage resources from the physical storage space;
   adding new logical storage resources to the control grid;
   configuration changes in the logical storage resources;
   failure of a server comprised in the storage control grid; and
   hot upgrade of a server comprised in the storage control grid.

6. The storage control grid of claim 1, wherein multiple servers of the plurality of servers are configured as service dispatchers, each service dispatcher is configured to (a) handle a service data structure indicative of an association between the services controlled by the storage control grid and associated service providers, and (b) update service data structures handled by other service dispatchers, in response to a change in the service data structure.

7. A storage system comprising a storage control grid, the storage control grid comprising a plurality of servers, wherein a first server of the plurality of servers is configured as a service dispatcher;
   wherein each service, of services controlled by the storage control grid, is associated with one server of the plurality of servers, acting as a service provider for providing the service;
   wherein each server of the plurality of servers is configured to initiate service requests and to send the service requests to the service dispatcher;
   wherein said service dispatcher is configured to:
   (i) in response to receiving a certain service request indicative of a requested service, identify, among the plurality of servers, a second server acting as a service provider associated with the requested service, and deliver the certain service request to the service provider;
   (ii) add the certain service request to pending service requests, wherein the pending service requests are service requests waiting for completion; and
   (iii) in response to an indication of a failure of the second server, check the pending service requests for service requests directed to second server, and if identifying the certain service request as a request waiting for completion by the second server, then forward the certain service request to another server of the plurality of servers that is configured as a secondary service provider associated with the requested service.

8. The storage system of claim 7, wherein the service dispatcher is further configured to update a service data structure, indicative of association between services and respective service providers, in response to at least one event selected from a group consisting of:
   subscribing a new service provider in the storage system;
   adding new physical storage resources to the storage system;
   deleting physical storage resources from the storage system;
   adding new logical storage resources to the storage system;
   configuration changes in the logical storage resources of the storage system;
   failure of a server comprised in the storage control grid; and
   hot upgrade of a server comprised in the storage control grid.

9. The storage system of claim 7, wherein the service dispatcher is configured to handle a service data structure that defines the service provider as having primary responsibility for providing the requested service; wherein said service data structure further defines another service provider associated with the requested service as having a secondary responsibility for providing the requested service; and
   wherein said service dispatcher is configured to enable delivery of said certain service request to the service provider having the primary responsibility, and is further configured to enable delivery of said certain service request to the other service provider having the secondary responsibility in case of a failure of the service provider having the primary responsibility.

10. The service dispatcher of claim 9, wherein said first server configured as the service dispatcher is a requesting server that initiated the service request.

11. A method of operating services within a storage control grid, the method comprising:
- associating each service, of services controlled by the storage control grid, with a server of a plurality of servers comprised in the storage control grid, wherein the server is acting as a service provider for providing the service;
- receiving, by a service dispatcher, a certain service request indicative of a requested service; wherein a first server of the plurality of servers is configured as the service dispatcher;
- in response to receiving the certain service request, identifying, among the plurality of servers, a second server acting as a service provider associated with the requested service;
- enabling, by said service dispatcher, delivery of said certain service request to the second server;
- adding the service request to pending service requests, wherein the pending service requests are requests waiting for completion by the second server;
- in response to an indication of a failure of the second server, checking the pending service requests for service requests directed to the second server, and if identifying the service request as a request waiting for completion by the at least one second server; then forwarding the service request to another server of the plurality of servers that is configured as a secondary service provider associated with the requested service.

12. The method of claim 11, further comprising updating a service data structure, indicative of association between services and respective service providers, in response to at least one event selected from a group consisting of:
- subscribing a new service provider in the storage control grid;
- adding new physical storage resources to a physical storage space coupled to the storage control grid;
- deleting physical storage resources from the physical storage space;
- adding new logical storage resources to the storage control grid;
- configuration changes in the logical storage resources of the storage control grid;
- failure of a server comprised in the storage control grid; and
- hot upgrade of a control module server comprised in the storage control grid.

13. The method of claim 11, wherein the service provider is configured to have a primary responsibility for providing said requested service with regard to a given address range and wherein the secondary service provider is configured to have a secondary responsibility for providing said requested service with regard to said given address range, wherein the method further comprising: reconfiguring a service data structure, indicative of an association between services and respective service providers, in response to the indication of the failure of said second server, wherein said secondary service provider is reconfigured to take over primary responsibility with regard to said requested service and said given address range.

14. The method of claim 11, wherein the storage control grid comprises two or more service dispatchers handling service data structures that include information related to the failed service provider, wherein the method further comprising respective reconfiguring all the service data structures regarding the failure.

15. The storage control grid of claim 1, wherein the service provider is configured to forward all pending service requests directed to the second server to other servers which have taken over responsibility with regards to services indicated in the pending service requests directed to the at least one second server.

16. The storage control grid of claim 1, wherein at least two servers are configured as service providers with regard to a type of the certain service, wherein each of the at least two servers is associated with a different address range with regard to the certain service.

17. The method of claim 11 comprising forwarding all pending service requests directed to the second server to other servers which have taken over responsibility with regards to services indicated in the pending service requests directed to the at least one second server.

18. The storage control grid of claim 11, wherein the certain service is associated with at least two servers, wherein each of the at least two servers is associated with a different address range with regard to the certain service.

* * * * *